US009333734B2

United States Patent
Fitch et al.

(10) Patent No.: US 9,333,734 B2
(45) Date of Patent: May 10, 2016

(54) METHOD OF MAKING RELEASABLE METALIZED EMBOSSED TRANSFER FILM

(71) Applicants: John Fitch, Middletown, RI (US); Tracy Paolilli, East Greenwich, RI (US); Scott Narkevicius, Wakefield, RI (US); Bonnie Adams, Charlestown, RI (US)

(72) Inventors: John Fitch, Middletown, RI (US); Tracy Paolilli, East Greenwich, RI (US); Scott Narkevicius, Wakefield, RI (US); Bonnie Adams, Charlestown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 133 days.

(21) Appl. No.: 14/473,320

(22) Filed: Aug. 29, 2014

(65) Prior Publication Data

US 2015/0000832 A1    Jan. 1, 2015

Related U.S. Application Data

(62) Division of application No. 12/983,040, filed on Dec. 31, 2010, now Pat. No. 8,852,719.

(51) Int. Cl.
*B32B 38/06* (2006.01)
*B32B 37/12* (2006.01)
(Continued)

(52) U.S. Cl.
CPC ............... *B32B 38/06* (2013.01); *B05D 3/002* (2013.01); *B32B 37/025* (2013.01); *B32B 37/26* (2013.01); *B44C 1/1716* (2013.01); *B44C 1/24* (2013.01); *B32B 2037/268* (2013.01);
(Continued)

(58) Field of Classification Search
CPC ........ B05D 3/002; B44C 1/1716; B44C 1/24; B32B 2037/268; B32B 2038/0092; B32B 2307/40; B32B 2311/00; B32B 2398/20; B32B 2451/00; B32B 37/025; B32B 37/26; B32B 38/06; G03H 1/0244; G03H 1/0252; G03H 2240/50; G03H 2250/10; G03H 2250/36; Y10S 428/914; Y10T 156/1039; Y10T 428/24479; Y10T 428/24521; Y10T 428/24545
USPC .................................................. 156/247, 249
See application file for complete search history.

(56) References Cited

U.S. PATENT DOCUMENTS 4,473,422 A    9/1984  Parker et al.
5,492,370 A *  2/1996  Chatwin .................. B41M 3/14
                                                      283/107

(Continued)

FOREIGN PATENT DOCUMENTS

WO    2006/108607 A2    10/2006

OTHER PUBLICATIONS source unknown: "Solid surface energy data (SFE) for common polymers", Nov. 20, 2007, pp. 1-2, XP002715775, Retrieved from the Internet: URL:http://www.surface-tension.de/solid-surface-energy.htm [retrieved on Oct. 31, 2013].

*Primary Examiner* — Sonya Mazumdar
(74) *Attorney, Agent, or Firm* — Jeffrey C. Lew (57) ABSTRACT

A method is presented for making releasable transfer film suitable to provide a metalized embossed composite onto a paper substrate without a release layer between the composite and a polymeric carrier layer. The transfer film includes a polymeric base layer, an embossing material layer and a metal layer. The transfer film is bonded to the paper substrate with an adhesive layer allowing the polymeric barrier layer to peel away from and to expose the metal-backed, embossing material layer. The substrate covered with the metalized embossed composite can be used to impart holographic style images to packaging, printed media products such as magazines.

12 Claims, 3 Drawing Sheets

(51) Int. Cl.

| | | |
|---|---|---|
| *B32B 37/14* | (2006.01) | |
| *G03H 1/02* | (2006.01) | |
| *G03H 1/04* | (2006.01) | |
| *B44C 1/24* | (2006.01) | |
| *B32B 37/00* | (2006.01) | |
| *B44C 1/17* | (2006.01) | |
| *B05D 3/00* | (2006.01) | |
| *B32B 37/26* | (2006.01) | |
| *B32B 38/00* | (2006.01) | |

(52) U.S. Cl.
CPC .... *B32B 2038/0092* (2013.01); *B32B 2307/40* (2013.01); *B32B 2311/00* (2013.01); *B32B 2398/20* (2013.01); *B32B 2451/00* (2013.01); *G03H 1/0244* (2013.01); *G03H 1/0252* (2013.01); *G03H 2240/50* (2013.01); *G03H 2250/10* (2013.01); *G03H 2250/36* (2013.01); *Y10S 428/914* (2013.01); *Y10T 156/1039* (2015.01); *Y10T 428/24479* (2015.01); *Y10T 428/24521* (2015.01); *Y10T 428/24545* (2015.01)

(56) References Cited

U.S. PATENT DOCUMENTS

| | | | |
|---|---|---|---|
| 5,665,194 A * | 9/1997 | Kay | B32B 38/10 |
| | | | 156/285 |
| 6,489,266 B1 | 12/2002 | Kurokawa et al. | |
| 6,531,024 B1 * | 3/2003 | Braun | B32B 7/06 |
| | | | 156/268 |
| 7,157,135 B2 | 1/2007 | Decker et al. | |
| 7,820,269 B2 | 10/2010 | Staub et al. | |
| 7,820,272 B2 * | 10/2010 | Torikoshi | G03G 7/0013 |
| | | | 399/127 |
| 2003/0107709 A1 | 6/2003 | Rodick | |
| 2008/0152797 A1 | 6/2008 | Biondi et al. | |
| 2008/0213551 A1 | 9/2008 | Funicelli et al. | |

\* cited by examiner

METHOD OF MAKING RELEASABLE METALIZED EMBOSSED TRANSFER FILM

FIELD OF THE INVENTION

This invention relates to the fabrication of metalized diffraction patterned coatings on substrates. More specifically it relates to a releasable film for transferring a metalized, embossable defraction pattern coating onto a paper-based substrate.

BACKGROUND OF THE INVENTION

Various commercial consumer goods are increasingly using glossy holographic style imaging. These image effects are appearing on product packaging such as, for example, toothpaste and magazine covers.

The holographic style image is created by light reflecting from an object, the outer layers of which include an outermost diffraction pattern-embossed coating, a metalization layer, an adhesive layer and a substrate layer. The diffraction pattern coupled with the reflective property of the metal creates the holographic effect. The adhesive layer bonds the metalized surface of the embossed coating to the substrate. Typically the substrate is a paper or paper-like composition.

Generally, the multilayer composite is created in several steps utilizing coating transfer. A conventional process involves application of a release layer onto a carrier film. Then an embossing material layer is placed on the release layer. The diffraction pattern is next created by embossing the carrier/release/coating composite. Next, the exposed and embossed surface of the coating layer is metalized, i.e., a thin layer of reflective metal is deposited thereon. The substrate is prepared by applying to its outer surface a layer of suitable adhesive. The metalized surface of the carrier film composite is joined to the adhesive-bearing substrate after which the adhesive is activated to form a permanent bond. Lastly, the carrier film is pulled away from the substrate. Separation of the release layer from the coating layer transfers the embossed metalized coating layers adhered to the substrate. The substrate is then incorporated into selected end use applications.

Common traditional processes suffer from the need to employ a release layer between the carrier and the embossing material layer. The release layer composition provides compatibility between the carrier material and the coating material such that they can be carried through the embossing and metalizing steps while remaining intact. The release layer also must have a properly weak bond to the coating layer such that after activating the permanent adhesive layer, the carrier with release layer can cleanly strip away from the finished substrate. Use of release layer adds to the cost of the materials, cost of equipment to apply the materials and complexity of the process for making the product. In short, use of a release layer is undesirable as it reduces productivity and increases cost to of the holographic style image-bearing substrate product.

Another conventional holographic image transfer technique includes coating a carrier film, such as polyester, with an embossable material, embossing and metalizing the composite. The film metalized embossed composite is laminated to a substrate product and the carrier film is not removed, that is the image is viewed through the carrier film layer remaining on the product. It is desirable to have an image transfer film technology in which the carrier layer can be removed, recovered and, to even better advantage, recycled.

It is desirable to have a simpler, more easily utilized, less wasteful and lower cost method to transfer embossable metalized coating layers to suitable substrates that does not employ a release layer.

U.S. Pat. No. 4,473,422 teaches a method for producing a metalized paper or board product having a bright surface and improved scratch resistance, comprising a transfer metalization technique utilizing a tie coat applied to the metal layer and a pressure-sensitive, adhesive coat applied to the tie coat, the adhesive coat binding the metalized composite to the paper or board base. The adhesive coat is applied to the paper or board base in the dry state and in combination with the adjacent tie coat, forms a hard, stable bond with the base that favorably withstands subsequent deformation of the paper or board product. A top coat utilizing a particular solvent mixture, offers consistent wettability of adhesive release coats, and provides a smooth, continuous outer surface for the final product. US '422 differs from the present invention in several ways. The present invention applys a coating to a base polyester film, which is then embossed and metalized. The present base film is releasable after the embossing process has taken place.

U.S. Pat. No. 7,157,135 describes embossable films and methods for making embossable films for creating holograms and diffraction gratings. The embossable films include a base substrate film and a co-extruded embossable layer. The embossable layer is coated with a transparent high refractive index (HRI) coating. The patented invention does not offer transfer release.

Transfer techniques to apply metallic coatings to substrates, such as fabric, leather or plastic surfaces, have been in use for a long time. Thus, the technique of gold leaf transfer was utilized in the 19th century by bookbinders, who employed gold foil transfer sheets to attach gold letters to leather bindings. The transfer sheets comprised a waxed carrier web over which a sheet of gold foil was placed, the gold foil coated on its free side with a heat-activated adhesive layer. In practice, the transfer sheet was hot pressed with a heated die to adhere the metal foil to the leather, and the carrier was thereafter stripped away. The waxy parting layer that was coated initially over the carrier, served to maintain the gold leaf in position on the carrier prior to its transfer, and to permit release of the carrier after the gold had been affixed to the leather.

In recent times, the advent of vapor deposition of metals, such as aluminum and the like, has spurred further interest in the use of this metalization technique for the preparation of a variety of metalized substrates. Thus, techniques of both direct and transfer coating have been attempted on a variety of base materials. There is a need for a method to provide a metalized embossed composite material into a substrate without requiring a release layer between the composite material and a barrier layer.

SUMMARY OF THE INVENTION

Disclosed is a releasable transfer film, suitable for providing a metalized embossed composite onto a substrate such as paper without a release layer between the composite and a polymeric carrier layer. The transfer film includes a polymeric base layer, an embossing material layer and a metal layer. The transfer film is bonded to the substrate with an adhesive layer allowing the polymeric barrier layer to peel away from and to expose the metal-backed, embossing material layer. The substrate that is covered with the metalized embossed composite can be used to impart holographic style images to packaging and printed media products such as magazines. This invention provides an improvement in the field of processing metalized embossed diffraction coatings on substrates in view that present day technologies do not allow for easy transfer and/or release of a base film after the embossing process has taken place.

This invention thus provides a releasable metalized embossed transfer film comprising (a) a polymeric base layer, (b) an embossing material layer in direct contact with the polymeric base layer, and (c) a metal layer in direct contact with the embossing material layer opposite the polymeric base layer, in which the polymeric base layer and and embossing material layer have an interfacial joint formed by coating a liquid comprising an embossing material composition onto a surface of the polymeric base layer which surface has a surface energy less than about 60 dynes/cm, and in which the embossing material layer comprises a polymer having high toughness.

There is also provided a method of forming a releasable metalized embossed transfer film comprising the steps of (A) providing a polymeric base layer defining a side having a surface energy in the range of about 50-60 dynes/cm, (B) applying in direct contact with the side of the polymeric base layer an embossing material layer comprising a polymeric composition exhibiting an elongation at break of about 400-550% determined by ASTM method D882010, (C) embossing a surface on a side of the embossing material layer opposite the polymeric barrier layer in which the surface defines a diffraction grating pattern, and (D) depositing a metal layer of thickness in the range of about 20-50 nm on the surface of the embossing material layer.

There is further provided a method of forming a light-diffracting multilayer composite comprising the steps of (A) providing a polymeric base layer defining a side having a surface energy in the range of about 50-60 dynes/cm, (B) applying in direct contact with the side of the polymeric base layer an embossing material layer comprising a polymeric composition exhibiting an elongation at break of about 400-550% determined by ASTM method D882010, (C) embossing a surface on a side of the embossing material layer opposite the polymeric barrier layer in which the surface defines a diffraction grating pattern, and (D) depositing a metal layer of thickness in the range of about 20-50 nm on the surface of the embossing material layer, thereby forming a releasable metalized embossed transfer film, (E) providing a substrate and an adhesive layer on the substrate, (F) contacting the metal layer of the releasable metalized embossed transfer film with the adhesive layer of the substrate, (G) activating the adhesive layer, thereby bonding the releasable metalized embossed transfer film to the substrate, and (H) removing the polymeric base layer from the embossing material layer.

DETAILED DESCRIPTION OF THE INVENTION

Aspects of this invention relate to a directly embossable, coated film including, biaxially oriented polymer film, and a coating applied to the polymer film. The base film can be any type of PET or PET type of film, any type of biodegradable film, as well as a variety of polyolefin films such as polypropylene, polyethylene, etc. The coated surface is susceptible to embossing under heat and pressure as well as being able to undergo transfer when used in conjunction with specified adhesives and a method of producing a coated, directly embossable surface.

Accordingly, this invention provides a releasable transfer film comprising (a) a polymeric base layer, (b) an embossing material layer being in direct contact the polymeric base, and (c) a metal layer in direct contact with the embossing material layer, in which the polymeric base layer and embossing material layer have an interfacial joint formed by contacting the embossing material layer with the polymeric base layer having a surface energy of less than about 60 dynes/cm, and in which the embossing material layer comprises a polymer having high toughness. By "high toughness" is meant that tensile elongation at break is about 400%-550% as calculated by ASTM method D882-10.

This invention also provides a method of forming a releasable transfer film comprising the steps of (A) providing a polymeric base layer defining side having a surface energy of less than about 60 dynes/cm, (B) applying to the polymeric base layer an embossing material layer comprising a polymer having high toughness such that the side of the base layer is in direct contact with embossing material layer, (C) embossing the embossing material layer to form an embossed surface defining a diffraction grating pattern, and (D) depositing a metal layer of thickness in the range of about 20-50 nm on the embossed surface.

This invention further provides a method of forming a light-diffracting multilayer composite comprising the steps of (A) providing a polymeric base layer defining a side having a surface energy of less than about 60 dynes/cm, (B) applying to the polymeric base layer an embossing material layer comprising a polymer having high toughness, such that the side is in direct contact with the embossing material layer, (C) embossing the embossing material layer to form an embossed surface defining a diffraction grating pattern, (D) depositing a metal layer of thickness in the range of about 20-50 nm on the embossed surface, thereby forming a releasable transfer film, (E) providing a substrate and an adhesive layer on the substrate, (F) joining the releasable transfer film with the substrate such that the metal layer is in contact with the adhesive layer, (G) activating the adhesive layer, thereby bonding the metal layer to the substrate, and (H) removing the polymeric base layer from the embossing material layer.

Figure 1A:
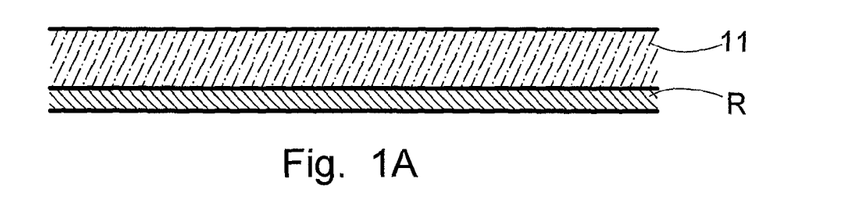
FIG. 1A is a cross section view of a composite of a polymeric carrier layer and release layer as employed in conventional metalized embossed transfer film technology.
Figure 1B:
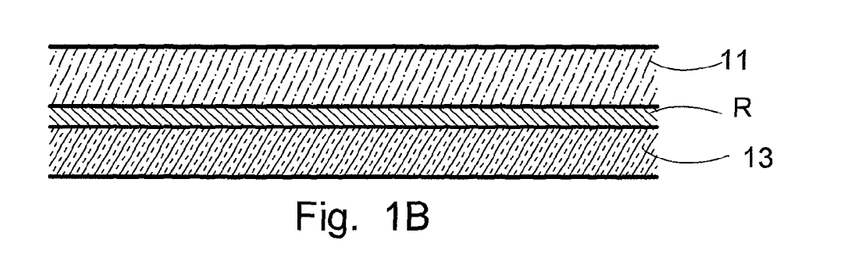
FIG. 1B is a cross section view of the composite of FIG. 1A with an additional embossing material layer.
Figure 1C:
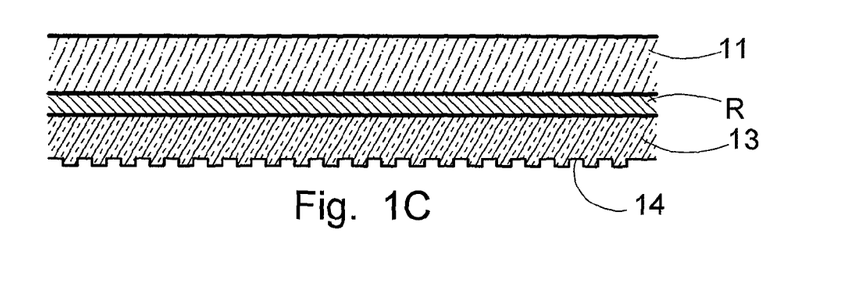
FIG. 1C is a cross section view of the composite of FIG. 1B showing the surface created by embossing of the embossing material layer.
Figure 1D:
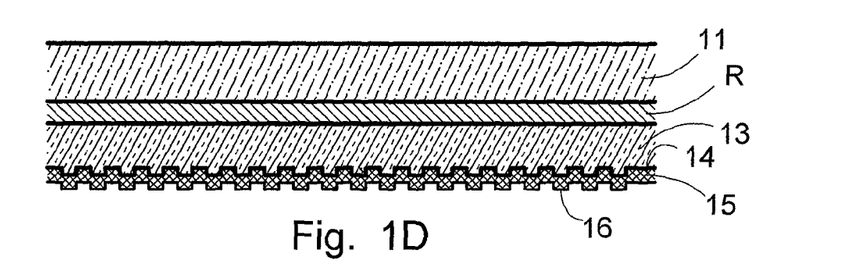
FIG. 1D is a cross section view of a conventional metalized embossed transfer film formed by adding a metal layer to the composite of FIG. 1C.

The present invention can be explained in relation to a traditional structure and conventional multi-step process that may be understood with reference to FIGS. 1A-1G. FIG. 1A depicts a conventional polymeric carrier film 11 coated with a release layer R in an initial stage of forming a metalized embossing film. An embossing material layer 13 is placed on the side of the release layer opposite the polymeric carrier film (FIG. 1B) and this preform composite is processed in an embossing operation to produce a textured surface 14 (FIG. 1C) on the embossing material layer 13. Following creation of the embossed surface, a metal layer 15 (FIG. 1D) is deposited on surface 14 of the embossing material layer 13. The metal layer is deposited by techniques that preferably make the the metal layer very thin. A multilayer composite with a thin metal layer is occasionally referred to as a "metalized film". Because the metal layer is so thin, its surface contour 16 typically follows the contour of the embossed surface 14 of layer 13.

Figure 1E:
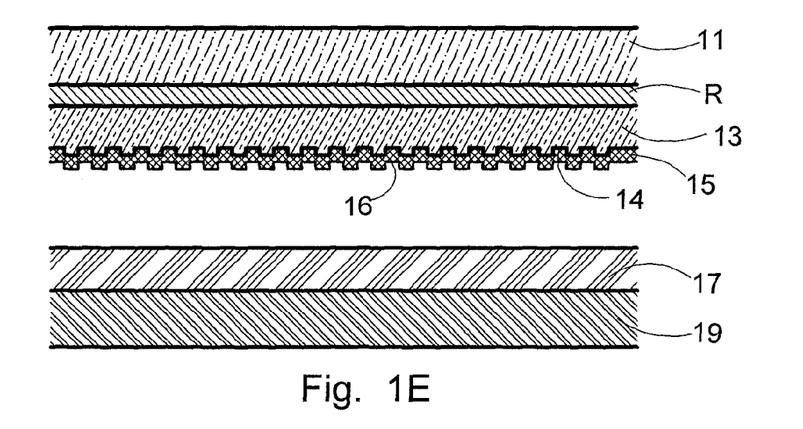
FIG. 1E is a cross section view of the conventional metalized embossed transfer film of FIG. 1D juxtaposed in relation to an adhesive coated substrate.
Figure 1F:
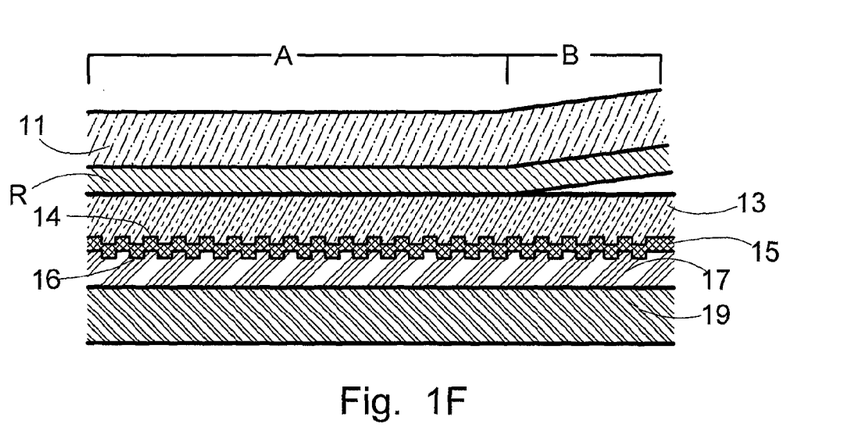
FIG. 1F is a cross section view of the conventional metalized embossed transfer film of FIG. 1E at stages of application to and removing from the adhesive coated substrate.

The thus produced metalized embossed transfer film can be packaged for storage and later use, or it can be used directly to deploy on a substrate product. The latter utility is illustrated with reference to FIGS. 1E-1G Usually the metalized embossed film is to be applied to a substrate in the form of a polymeric film 19. To bond the metalized coating layer to this film, the substrate 19 is coated with an adhesive layer 17 (FIG. 1E). Next the metalized embossing film is placed adjacent to the adhesive coated substrate with the metal layer 15 in contact with the adhesive layer 17 as shown at the left portion A of FIG. 1F. The adhesive is activated to affix the metalized transfer film to the substrate.

Adhesive activation is preferably accomplished by exposure to heat and pressure. The adhesive layer 17 typically becomes soft and sufficiently fluid to conform to the exposed textured metal surface 16 of the metalized film. The finished product is obtained by removing the polymeric carrier film 11. The carrier film separates from the embossing material layer 13 by peeling as seen in the right portion B of FIG. 1F. In conventional technology, the release layer R enables separation during which the release layer and polymeric carrier film are removed together. This leaves a finished product, multilayer composite 10 of a substrate 19 covered with a metalized embossed composite coating 13, 15, 17 shown in FIG. 1G.

In general, the combination of materials of traditional transfer film technology are selected to obtain suitable release characteristics. That is, the release layer composition is highly compatible with the polymeric film layer. It is sufficiently compatible with the embossing material layer that layer R will temporarily adhere to layer 13 during the production process including the optional packaging and storing steps. However, the release layer is chosen to permit ready separation of the polymeric film and thus transfer of the metalized embossing material layer to the substrate as described.

In contrast to the above-described conventional technology, the present invention provides a novel releasable metalized embossed transfer film without a layer of release material positioned between a polymeric base layer and the metalized embossing material. By proper selection of materials and operating conditions according to this invention the metalized surface of the transfer film can be affixed to an adhesive coated substrate after which the polymeric base layer, being in direct contact with the embossing material layer, can be peeled away therefrom.

Figure 1G:
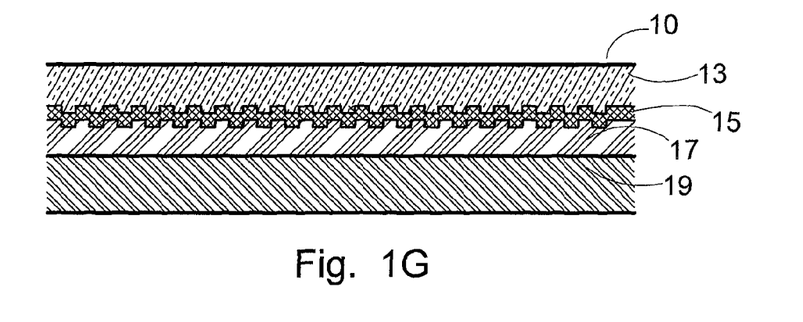
FIG. 1G is a cross section view of a product composite of a substrate and a metalized embossed film resulting from peeling the polymeric carrier and release layers away from the adhesive coated substrate of FIG. 1F.
Figure 2A:
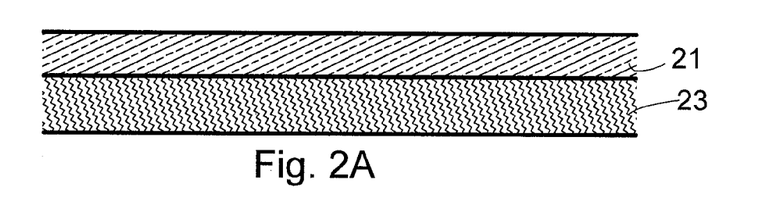
FIG. 2A is a cross section view of a novel polymeric base layer and an embossing material layer precursor composite for a releasable metalized embossed transfer film according to the present invention.
Figure 2B:
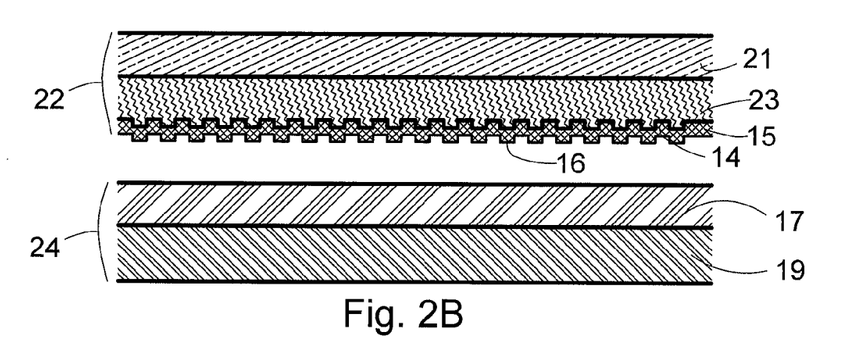
FIG. 2B is a cross section view of a novel releasable metalized embossed transfer film according to the present invention juxtaposed with an adhesive coated substrate.
Figure 2C:
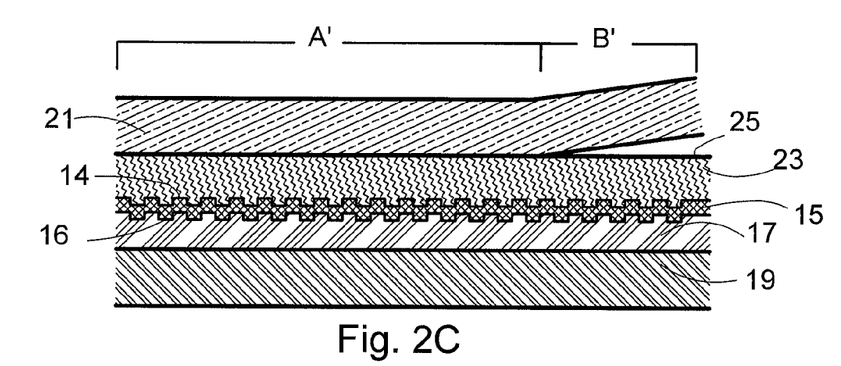
FIG. 2C is a cross section view of the novel metalized embossed transfer film of FIG. 2B at stages of application to and removing from the adhesive coated substrate.

An exemplary light-diffracting covered substrate product made by use of the novel releasable metalized embossed transfer film of this invention can be understood with reference to FIGS. 2A-2D. The product 20 (FIG. 2D) has a structure comparable to that of multilayer composite 10 (FIG. 1G). The novel releasable transfer film used to make multilayer composite 20 is seen in FIG. 2A is built upon a polymeric base layer 21 onto a side of which is placed an embossing material layer 23. In subsequent fabrication steps, the exposed side of the embossing material layer is embossed to create a textured surface 14 (FIG. 2B). A thin layer of metal 15 is deposited on textured surface 14 to form a metal layer also with textured surface 16. The embossed and metalized transfer film 22 is then juxtaposed in relation to a substrate component, such as layer 19 on which is positioned an adhesive layer 17, this adhesive coated substrate being designated as composite 24.

Figure 2D:
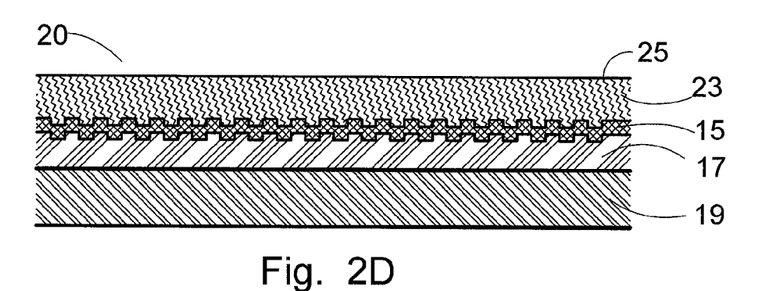
FIG. 2D is a cross section view of a product composite of a substrate and a metalized embossed film resulting from peeling the polymeric base layer from the novel metalized embossed transfer film and the adhesive coated substrate of FIG. 2C.

In still further steps, the metalized embossed transfer film 22 is laminated to the substrate composite 24 of the substrate layer 19 coated with the adhesive layer 17. The two composites 22 and 24 are brought into contact as seen in left portion A' of FIG. 2C. While in contact adhesive 17 is activated such that transfer film 22 joins to substrate composite 24. Optionally, heat and/or pressure can be applied to create the sealing bond of the adhesive layer 17. At this stage the polymeric base layer 21 is peeled away from the technical back surface 25 of the embossing material layer 23. This is seen in the right portion B' of FIG. 2C. Because of the selection of polymeric base layer and embossing material layer composition, the base layer can adhere satisfactorily to the technical back surface of the embossing layer for purposes of making the metalized embossing material layer and assembling the product composite 20 (FIG. 2D). Yet the adherence is weak enough that the polymeric base layer can be pulled off of the product composite leaving substantially all of the metalized embossing layers intact and bonded to the substrate 19 by adhesive layer 17. No release layer is used.

In a preferred embodiment the embossing step produces a pattern of diffraction grating lines. Thus light impinging on the outer surface 25 of the embossing material layer will be diffracted when reflected from the metal layer 15, thereby producing a holographic style effect.

Suitable metal layer materials used herein include Al, Au, Ag, Cu, Pt, Ni, Ti, Ta and mixtures thereof. The metal layer is generally at a thickness of about 20-50 nm. Many thin film metal deposition techniques can be used, such as chemical vapor deposition, sputtering and the like. The metal layer is preferably applied by vacuum deposition.

The adhesive is selected with the objective of providing a strong bond between the metal layer and the substrate. In fulfilling this objective, the adhesive layer thus affixes the metal side of the metalized embossing material film to the substrate. The adhesive layer is selected from the group consisting of polyester, internally or externally plasticized copolyester, internally or externally plasticized acrylics, epoxy-based resins, PVA (polyvinylacetate) based resins, polyurethane-based laminating adhesive and the like. The compositions utilized in layers 15, 17, and 19 are substantially the same those in conventional transfer films that use a release layer. However, the strength of this bond should be greater than that between the polymeric base layer and the embossing material layer to assure that peeling of the base layer from the product composite 20 does not cause the metal-to-substrate bond fail.

Typical examples of substrate are paper, paper like sheets or film, polymeric film and fabrics. The adhesive can be any strong composition. A pressure sensitive adhesive is preferentially contemplated.

Preferred compositions for the polymeric base layer are polyester, polyhydroxy acid and polyolefin. To obtain satisfactory releasable adhesion of the base layer to the embossing material layer, it is desirable to induce a surface energy of the coat-carrying side at about 50-60 dynes/cm, preferably 50-58 dynes/cm and more preferably the surface energy should be about 54 dynes/cm. The surface of the side of the base layer facing the embossing material layer can be treated before applying the coating layer as appropriate to obtain surface energy in the desired range. Surface treatment methods such as corona treatment may be used.

It is also important that the composition of the embossing material layer be such that this layer remains intact when the carrier is peeled away. Thus the embossing material should be suitably tough. That is, the embossing material should have suitable intrinsic structural integrity. Toughness for this purpose is primarily measured by the tensile strength properties of the embossing material, and particularly elongation at break. Preference is given to polyurethane as the composition of the embossing material layer. A polyurethane with tensile elongation at break of about 400%-550% is preferred as determined by ASTM analytical method D882-10.

EXAMPLES

A tape transfer test was used in the examples, as follows. After a substrate was coated with a test composition, the coating was dried to form a layer on the substrate and 3M® 810 tape was pressed onto the surface with a 2 lb (908 g) rubber roll. The tape was then briskly pulled from the sample at an angle of 180 degrees. The amount of coated layer removed from the sample by the tape was given an estimated numerical value of the percentage of area of the transferred based on visual examination. Accordingly, 0% indicates that none of the coated layer was transferred and 100% indicates that all of the coated layer was removed from the substrate. Three trials were performed for each experiment and the average values were reported. The tape transfer test was meant to simulate the ability of the tested embossing material layers to adhere from the tested substrate film to the 3M tape representing an adhesive coated product substrate (i.e. film 24 FIG. 2B). Due to the subjective nature of the visual examination determination of transferred material, a value of 90% or was deemed acceptable.

Embossing evaluation of the example films was done as follows: A hot roll laminator (ChemInstruments, Fairfield, Ohio) with an 18 inch (46 cm) wide, hot roll and matching 18 inch wide rubber backing roll was used to emboss test film material. A 4 inch by 4 inch (10 cm by 10 cm) nickel embossing shim was placed on top of the sample to be tested. The nickel embossing shim used was selected from among a series of diffraction grating lines of depths in the range of 0.05 to 0.2 µm, the lines being arranged in a variety of patterns such as "starburst" and "circle within a circle" designs. Both rolls were heated to 220° F. (104° C.). The film sample and shim were passed together into the nip between hot roll and backing roll at a speed setting of approximately 10 feet/minute (3 m/min.) with a nip pressure of 400 psi (2.8 Mpa). The sample was removed and placed on a bench top to cool to room temperature. The film was then slowly peeled off the shim at a 45 degree angle so as to preserve the image impressed into the embossed material. To enhance visibility of the embossed image, the sample was placed on a black background and examined under flourescent lighting by visual inspection for embossing quality. Embossing quality was rated as follows: "Excellent" for bright colors viewed from many angles with no unembossed areas, "Good" for slightly attenuated color brightness viewed from multiple angles, "Fair" for moderately attenuated color brightness, and "Poor" for dull colors and unembossed areas.

The surface energy of the samples were measured by applying a series of Accu Dyne Test solutions (Diversified Enterprises, Claremont, N.H.) to the sample surface with cotton swabs. The solutions are liquids calibrated to surface energies in the range of 30-70 dynes/cm. The surface energy of the sample was indicated by the designation of the highest dyne-valued test solution that wetted the surface without beading.

Coat weight was measured by the following gravimetric method. A coated substrate to be analyzed was dried and cut to a sample size of 4 inch by 4 inch (10 cm by 10 cm). The sample was weighed on an analytical balance with at least 2 decimal place accuracy. The coating was then removed by dissolving the coating composition in a solvent such as acetone. The sample was dried and weighed again. The difference between the coated and uncoated sample was reported as the dry coat weight in grams per square meter or "gsm".

In the samples percentages are by weight unless indicated otherwise.

Comparative Example 1

An acrylic embossing material composition in aqueous medium was coated onto a polyester film. The embossing material composition coating liquid included 49% Setaqua™ 6472 acrylic copolymer emulsion (Nuplex Resins, LLC, Louisville, Ky.), 2% Dowanol PPH (Dow Chemical Co., Midland, Mich.), 0.5% Chemslip 25 wax, (ChemCor, Chester, N.Y.), and 0.2% Surfynol® 440 surfactant (Air Products and Chemical, Inc., Allentown, Pa.). The acrylic copolymer in Setaqua 6472 is a thermoplastic with a glass transition temperature ("Tg") of 40° C. Dowanol PPH is a coalescent glycol ether serving as a temporary plasticizer. Chemslip 25 is a synthetic wax emulsion used here as an embossing shim release aid. Surfynol 440 surfactant is a 100% active liquid, ethoxylated wetting agent and defoamer serving here to reduce the surface tension of the liquid embossing material composition which aids in the wetting of the solution to the substrate. The aqueous embossing material composition coating liquid was applied to the polyester film and the water was removed by drying. The composition was applied to the film at a rate effective to achieve a dried embossing material layer thickness of 0.1 to 0.4 µm. The transfer film was analyzed for embossing quality and for transfer from the base layer by the tape test. This acrylic polymer based composition was rated excellent for embossing but provided 0% tape transfer. Although it is a very good embossing material, it lacked the toughness to be completely released from the polyester base layer film to the tape.

Comparative Example 2

The procedure of Comp. Ex. 1 was repeated except that Setaqua 6472 was reduced to 44%, and 5% TEGO® ADDBOND DS 1300 (Evonik Tego Chemie GmbH, Germany), modified polyester containing dimethyl amino ethanol and 0.7% Chemcor 392N35 nonionic high density polyethylene were substituted for the Chemslip 25 and Surfynol 440 components in the embossing material composition. Embossing quality rating was excellent and tape transfer was 0%.

Comparative Example 3

The procedure of Comp. Ex. 1 was repeated except that 0.2% Tego 505, an alkoxylated alcohol (Evonik Tego Chemie) was added to the embossing material composition formulation. Tego 505 was intended to serve as release agent and surfactant to increase release of the acrylic embossing layer. Tape transfer increased to 80%, however, embossing quality was poor.

Comparative Example 4

A coating liquid of 80% Neocryl BT 67 from DSM Neoresins and 20% of 10% solids Polyox N80 was prepared. Neocryl BT67 is a 0° C. Tg anionic acrylic emulsion and Polyox N80 is a water soluble polyethylene oxide thermoplastic resin. The liquid was coated onto a polyester film, dried. Embossing quality was rated as good but tape transfer was 20%.

Comparative Example 5

The procedure of Comp. Ex. 1 was repeated except that Polyox N80 polyethylene oxide was added to the embossing material composition and proportions of the components were adjusted to 40.6% Setaqua 6472, 1.8% Dowanol PPH, 0.43% Chemslip 25, 0.17% Surfyno 440, and 17% Polyox N80. This embossing material composition did have good embossing quality but tape transfer was only 80%.

The above experiments show that an acrylic based embossing layer as applied was too weak to transfer substantially as an integral unit from the base layer to the adhesive tape substrate.

Example 1

Solucote 1051i-2-25 (DSM NeoSol Inc., East Providence, R.I.), Solucote 1051i-2-25 was coated using a No. 4 mayer rod coating system onto a non-surface treated polyester film having surface energy measured at 52 dynes/cm. Solucote 1051i-2-25 is a 35% nonvolatile content, aqueous emulsion of aliphatic urethane. The coated film was dried in an oven at 190° C. for 15 seconds producing a 2.6 g/m$^2$ polyurethane embossing material layer with elongation of 470%. The coated film was embossed at 210° F. (99° C.) and produced an excellent embossing quality rating. The embossed layer transferred readily to the adhesive tape in the tape test to yield a 100% tape transfer value.

Comparative Example 6

The procedure described in Ex. 1 was repeated except that prior to coating with the embossing material liquid, the polyester substrate surface was corona treated using a handheld BC20AC laboratory corona treatment device. The treated surface had surface energy of 60 dynes/cm. The dried embossing layer had a 2.6 g/m$^2$ weight and produced an excellent embossing quality rating. However, the tape transfer test gave a measurement of 20% indicating that adhesion to the base layer had increased significantly due to corona treatment, hence the embossing material layer would not transfer well to the adhesive tape.

Comparative Example 7

The procedure described in Ex. 1 was repeated except that the urethane solids in the coating emulsion was reduced to 15% by adding water. The surface energy was 52 dynes/cm, as in Ex. 1, and embossing quality rating was excellent, however the lower embossing material concentration yielded lower transfer to the tape. Because of the diluted coating liquid, the dry weight of the embossing layer was 1.14 g/m$^2$. The thickness of embossing layer was insufficient to maintain structural integrity to peel as a unit from the substrate despite the proper surface energy.

Comparative Example 8

The procedure described in Comp. Ex. 3 was repeated except that the polyester base layer film was corona treated to a surface energy of 60 dynes/cm prior to coating with the polyurethane embossing material layer. The embossing layer weight on the base layer film was again 1.14 g/m$^2$. Because of the increase of surface energy and adhesion to the base layer coupled with the light coating of embossing material, only 15% embossing material layer transferred to the tape demonstrating that the embossing material layer was too thin for strength to cohesively transfer from the substrate. Embossing quality rating of the embossing material layer was excellent.

In the following examples, a series of releasable embossing metalized transfer films were prepared by coating a polyurethane embossing material onto a polyester film. The polyurethane compositions in the series had different degrees of elasticity. The liquid coating compositions were applied to the polyester film with a Mayer coating technique using a No. 3 Mayer rod. The amount of water medium for all of the liquid coating compositions and feed conditions were adjusted to achieve an embossing material layer weight of approximately 2.0 g/m$^2$ after drying in an oven at 230° C. for 15 seconds. The coated films were then embossed with a hot roll laminator as described above. The embossed surface of the samples were metalized (i.e., overcoated) with aluminum in a bell jar vacuum metalization chamber. After metallization, the aluminum coating had optical density of about 2-3. Embossing quality, elongation at break and tape transfer were measured for each releasable metallized embossing film.

Comparative Example 9 utilized for the embossing material Neorez® R-986 (DSM Neoresins, Waalwijk, NL) an emulsion of aliphatic urethane providing low elasticity polyurethane embossing material layer with good tape transfer (90%) but poor embossing quality. Elongation at break was 160%.

Comparative Example 10 utilized DSM Neoresins Neorez R-9621 aliphatic polyester urethane dispersion. The embossing material layer provided very high (630%) elongation with good embossing quality. Tape transfer was 0% indicating too much adhesion of embossing layer to the base layer film.

Comparative Example 11 the embossing material was Bondthane™ UD 250 (Bond Polymers International LLC, New Hampshire). Elongation at break was low (200%), embossing quality was very poor, and tape transfer was 50%.

Example 2 utilized Bondthane UD 211 for the embossing material and the analytical results were at the limit of acceptability for a releasable metalized embossing transfer film (elongation at break 400%, embossing quality fair, and tape transfer 90%.

Example 3 utilized DSM Neoresins Solucote 1051 I-2-25, an aliphatic polyurethane dispersion and included a 5% concentration of Surfynol 420 surfactant. The embossing material composition developed superior analytical results of 470% elongation at break, excellent embossing quality and 100% tape transfer.

Example 4 used DSM Neoresins Solucote 1372, an aliphatic polyurethane dispersion with no surfactants. Elongation at break was again 470% and embossing quality was excellent. Release property determined by tape transfer test was slightly lower than Ex. 3, perhaps due to lack of surfactant. Nevertheless, the 95% tape transfer value was deemed acceptable performance for the releasable metalized embossed transfer film.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims. Disclosure of all U.S. patents and patent applications identified in this disclosure, including U.S. patent application Ser. No. 12/983,040 filed Dec. 31, 2010, and having application publication no. US 2011/0317269, are hereby incorporated by reference herein.

What is claimed is:

1. A method of forming a releasable metalized embossed transfer film comprising the steps of
   (A) providing a polymeric base layer defining a side having a surface energy less than 60 dynes/cm,
   (B) applying in direct contact with the side of the polymeric base layer an embossing material layer comprising a major fraction of polyurethane, the embossing material layer exhibiting an elongation at break of about 400-550% determined by ASTM method D882010,
   (C) embossing a surface on a side of the embossing material layer opposite the polymeric barrier layer in which the surface defines a diffraction grating pattern, and
   (D) depositing a metal layer on the surface of the embossing material layer.

2. The method of claim 1 in which the polymeric base layer comprises, as a major fraction, a polymer selected from the group consisting of polyester, polyhydroxyacid, polyolefin and a blend thereof.

3. The method claim 1 in which the metal layer comprises, as a major fraction, a metal selected from the group consisting of Al, Au, Ag, Cu, Pt, Ni, Ti, Ta and a mixture thereof.

4. A method of forming a light-diffracting multilayer composite comprising the steps of
   (A) providing a polymeric base layer defining a side having a surface energy less than 60 dynes/cm,
   (B) applying in direct contact with the side of the polymeric base layer an embossing material layer comprising a major fraction of polyurethane, the embossing material layer exhibiting an elongation at break of about 400-550% determined by ASTM method D882010,
   (C) embossing a surface on a side of the embossing material layer opposite the polymeric barrier layer in which the surface defines a diffraction grating pattern, and
   (D) depositing a metal layer on the surface of the embossing material layer, thereby forming a releasable metalized embossed transfer film,
   (E) providing a substrate and an adhesive layer on the substrate,
   (F) contacting the metal layer of the releasable metalized embossed transfer film with the adhesive layer of the substrate,
   (G) activating the adhesive layer, thereby bonding the releasable metalized embossed transfer film to the substrate, and
   (H) removing the polymeric base layer from the embossing material layer.

5. The method of claim 4 in which removing the polymeric base layer comprises peeling the polymeric base layer such that substantially all of the embossing material layer remains bonded by the metal layer and adhesive layer to the substrate.

6. The method of claim 4 in which the adhesive layer comprises an adhesive composition selected from the group consisting of internally or externally plasticized copolyester, internally or externally plasticized acrylics, epoxy-based resins, PVA (polyvinyl acetate) based resins and polyurethane-based laminating adhesive.

7. The method of claim 4 in which the polymeric base layer comprises, as a major fraction, a polymer selected from the group consisting of polyester, polyhydroxyacid, polyolefin and a blend thereof.

8. The method of claim 4 in which the metal layer comprises, as a major fraction, a metal selected from the group consisting of Al, Au, Ag, Cu, Pt, Ni, Ti, Ta and a mixture thereof.

9. The method of claim 4 in which the surface energy is at least 50 dynes/cm.

10. The method of claim 4 in which the metal layer has thickness in the range of about 20-50 nm.

11. The method of claim 1 in which the surface energy is at least 50 dynes/cm.

12. The method of claim 1 in which the metal layer has thickness in the range of about 20-50 nm.

* * * * *